United States Patent
Richards et al.

[11] 3,785,370
[45] Jan. 15, 1974

[54] DETECTION OF IMPAIRED PULMONARY FUNCTION

[75] Inventors: Powell Richards, Bayport; Herbert Susskind, Huntington; Louis G. Stang, Jr., Sayville, all of N.Y.

[73] Assignee: The United States of America as represented by the United States Atomic Energy Commission, Washington, D.C.

[22] Filed: Sept. 14, 1972

[21] Appl. No.: 289,204

[52] U.S. Cl. ............................................. 128/2.08
[51] Int. Cl. .............................................. A61b 5/08
[58] Field of Search .......................... 128/2.08, 2.07

[56] References Cited
UNITED STATES PATENTS
3,527,205    9/1970    Jones .............................. 128/2.08
3,527,206    9/1970    Jones .............................. 128/2.08

OTHER PUBLICATIONS
Meade, et al., "Automatic Measurement of Lung Function", The Lancet, Sept. 18, 1965, pages 573–575.

Primary Examiner—Aldrich F. Medbery
Attorney—Roland A. Anderson, John A. Horan and Leonard Belkin

[57] ABSTRACT

A non-radioactive tracer technique for detecting the presence of impaired pulmonary function indicating disease of the small airways at a much earlier stage than is permitted by previously used techniques, which non-radioactive technique involves the introduction of a bolus of helium at residual volume and the measurement of the concentration of helium in the expirate. The point in vital capacity where the helium concentration in the expirate increases sharply above the alveolar plateau indicates the state of pulmonary function.

3 Claims, 2 Drawing Figures

DETECTION OF IMPAIRED PULMONARY FUNCTION

BACKGROUND OF THE INVENTION

It is known from studies reported earlier this century that lung ventilation is not evenly distributed. This unevenness has been attributed to regional expansion differences and various such regions have been postulated and identified. More recent studies have demonstrated convincingly that the principal regional variation in ventilation is vertical. Subsequently, the use of radioactive gas in a variety of techniques has made it possible to describe in greater detail the nature and extent of this uneven lung ventilation as well as to provide quantitative data in relation to this phenomenon.

From previous studies, such as those referred to above, it is known that there is a vertical gradient in ventilation distribution. Near RV (residual volume) most of the inspired gas goes into the upper parts of the lung and least to the lower. From zero to 25 percent VC (vital capacity), however, there is a progressive reversal in the distribution of inspired air until above 25 percent VC inspired gas is found to go preferentially to the lower lung zones, this distribution being essentially the same from 25 percent to 100 percent VC. This sequential behavior is explained by closure of some lower-zone airways at low lung volumes. The behavior is also found to be reversible; that is, during expiration, in the part of the breathing cycle from 100 percent VC to 25 percent VC most of the gas originates from the lower region whereas between 25 percent and zero VC most of the expiring gas originates from the upper region. These values will vary considerably with the age of a healthy person.

A unique advantage of radioactive-gas methods is that the regional concentrations of inhaled gas can be measured while that gas is in the lungs, and hence it has been possible to accurately locate the regions anatomically. Early work utilizing the radioactive gas $^{133}$Xe established a vertical gradient in ventilation distribution. More recent work, reporting in greater quantitative detail the nature and extent of this distribution, is described in "Regional Ventilation of the Lung, Studies with Boluses of $^{133}$Xenon" by Dollfuss et. al., Respiration Physiology (1967) 2, 234–246.

As a result of knowledge obtained from this line of work, some researchers have become interested in the application of this knowledge to determine impaired pulmonary function, such as for the early detection of emphysema, lung cancer, black lung disease, and other respiratory diseases. Unfortunately, the use of radioactive gases on a mass scale for the screening of large numbers of persons is not desirable because of the yet not fully understood long-term effects of population exposure to such levels of radioactivity. Also, in the case of a newborn infant, where breathing defects are sometimes difficult to detect and diagnose, and in the case of pregnant women, exposure of the patient to radioactivity is to be avoided except in clearly indicated situations. Further problems connected with radioactive-gas analysis techniques concern the expense, the time consumed, and the shielding and other equipment which are required.

When a suitable tracer such as radioactive $^{133}$Xe is injected into inspired air at zero to 25 percent of vital capacity and the presence of $^{133}$Xe in the expirate is plotted against percentage of vital capacity, as shown in FIG. 5 of the aforementioned publication by Dollfuss et al., a sharp upward inflection in the xenon concentration is observed toward the end of a characteristically straight portion, known as the "alveolar plateau." This inflection point, expressed as percent VC, is believed to indicate distal airway closure. It has come to be recognized that effects due to aging, pulmonary inpairment due to disease of the small airways, and irritants such as tobacco smoke will cause the point at which this significant rise takes place to move to a higher percentage of vital capacity. Unfortunately, methods in use up to now employing radioactive tracers are not suitable for large scale use for reasons already noted; furthermore, they yield a curve with a break that is insufficiently distinct to be useful on any mass level for locating possible pulmonary impairment.

SUMMARY OF THE INVENTION

The invention described herein was made in the course of, or under a contract with the U. S. Atomic Energy Commission.

The present invention utilizes the uneven distribution of ventilation within a lung and employs a non-radioactive tracer for the detection of impaired pulmonary function.

In accordance with a preferred embodiment of this invention, a finite volume of non-radioactive tracer gas is injected as a bolus into the airway leading to the lungs undergoing investigation. The injection is made at 0–25 percent vital capacity, but most preferably at residual volume, that is, just prior to inspiration, and, during the next expiration, the expirate is monitored at the mouth for tracer content to determine the point in terms of percentage vital capacity at which there is an abrupt decrease in expirate coming from the lower portion of the lung as indicated by an abrupt increase in the percentage of tracer concentration. The location of this abrupt increase when compared by known computer techniques to what is normal for the age and size of the lung as determined from statistically obtained and stored information suitably computerized indicates whether there is any impaired pulmonary function requiring more detailed investigation. Inspiration of the tracer gas bolus at residual volume is believed to provide a better identified break in the curve during expiration than bolus introduction at a higher inspired air volume.

Thus a principal object of this invention is to provide a method of detecting impaired pulmonary function.

Other objects and advantages of this invention will hereinafter become obvious from the following description of a preferred embodiment of this invention.

DESCRIPTION OF THE PREFERRED EMBODIMENT

A finite amount of helium is injected as a bolus into the passageway leading to the lungs just after forced expiration to the residual volume (RV), and the amount of air inspired is measured. The vital capacity (VC) and helium tension or concentration in the expired air at the mouth are then measured simultaneously and continuously and recorded, during the period of expiration immediately following inspiration.

Figure 1:
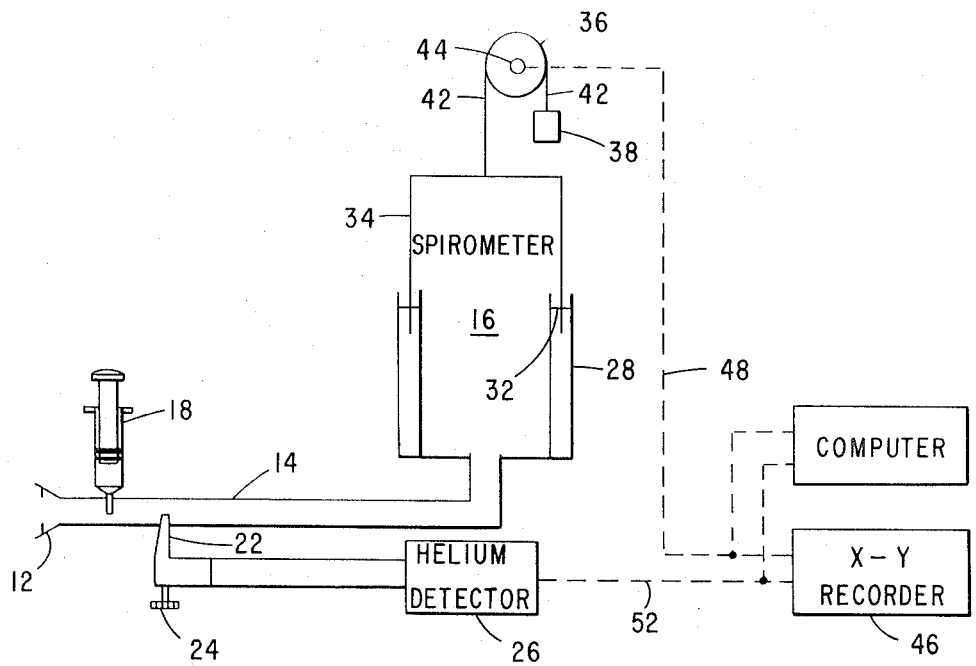
FIG. 1 is a schematic illustration of apparatus useful for carrying out the principles of this invention.

Apparatus for accomplishing this is shown in FIG. 1 wherein is illustrated a mouthpiece 12 at the end of a tube 14 leading to a spirometer 16. A conventional syringe 18 injects into tube 14 a finite amount of helium when squeezed. A needle valve 22 (operated by a wheel 24) also terminating within tube 14 extracts some air from the latter for helium concentration measurement in helium detector 26. It is understood that a vacuum pump (not shown) in detector 26 continuously extracts a small sample from tube 14. The size of the sample may be controlled by wheel 24. Detector 26 produces a signal indicative of the instantaneous concentration of helium.

Spirometer 16 consists of double walled open top container 28 with a suitable seal 32 and an inverted container 34, the up and down movement of which thus controls the volume formed by containers 28 and 34. A pulley wheel 36 with a weight 38 and a cable 42 balances container 34. A potentiometer 44 mounted on the shaft of pulley wheel 36 produces a signal indicative of the position of container 34 and hence the volume enclosed.

Figure 2:
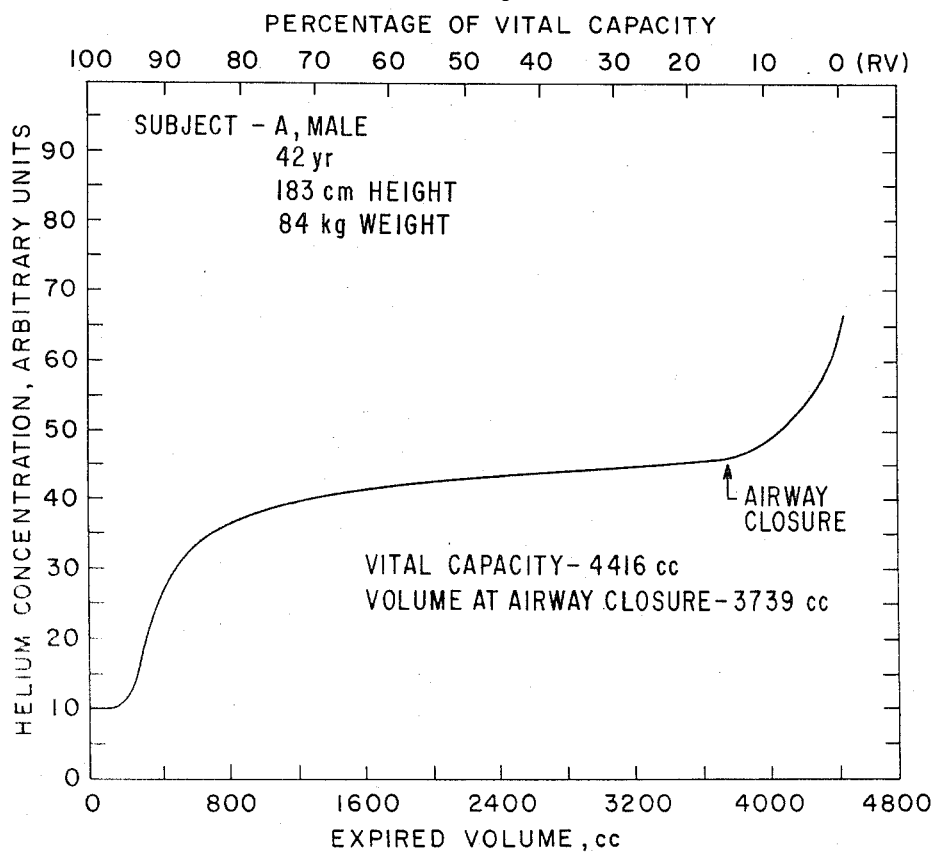
FIG. 2 is a graph showing a curve produced for a subject in accordance with the principles of this invention.

The signals from potentiometer 44 and detector 26 go to an x–y recorder 46, as indicated by the broken line connections 48 and 52 to produce the graph of the type shown in FIG. 2. A computer may also be used, as shown.

In the use of the apparatus shown in FIG. 1, the subject, who may be a human being, breathes through mouthpiece 12 from a previously filled spirometer 16. At the moment that inspiration starts, which may be indicated by macimum volume of spirometer 16, a bolus of helium is injected into tube 14 by squeezing syringe 18. When the next expiration begins and a small part of the expirate passes through needle valve 22, x–y recorder 46 produces a curve such as that shown in FIG. 2.

The "break" in the curve, i.e., the first departure from approximate linearity, is found to be reasonably identifiable and thus capable of being recorded and compared with similar data accumulated for persons having similar age, size, weight, and other factors found to bear on this particular characteristic. The comparison of the location of the break in the curve with similar data accumulated as just described is or may be conveniently accomplished by using well known computer techniques for storing such information and making the appropriate comparisons desired taking into account normal deviations as is understood in the art.

The use of helium as the non-radioactive tracer is found to be particularly advantageous. Helium is believed to give greater sensitivity than other gases commonly used in these studies. Its low density and rapid diffusion rate ensure its rapid distribution in all the air passages of the lung. The low solubility of helium in blood minimizes corrections for solubility effects, its concentration in the alveolar gas depending primarily on alveolar ventilation.

It will be noted that the graph obtained for a particular subject only requires one breathing cycle, and no analysis or other treatment of the data is required other than to note the percent of vital capacity at which the break in the curve occurs. Thus, the method described herein is capable of economic widespread use on a large number of persons to locate whose who have some sort of an impaired pulmonary function which should be considered in greater detail, similar to the approach taken in mass X-ray screening to detect tuberculosis and related disorders.

In an example of this invention, a 1-cc bolus of helium was introduced into a subject's mouth just after forced expiration to his residual volume, utilizing the apparatus shown in FIG. 1. The subject employed was a 42 year old male, height 183 cm., and weight 84 kg. Detector 26 was a CEC Model 24–120B helium detector, spirometer 16 was a 9-liter Collins Model P-900, and recorder 46 a Hewlett-Packard Model 2D-2, all commercially available. The curve obtained is that shown in FIG. 2. The break at about 15 percent VS is relatively sharp and easy to identify. According to current theory the break indicates distal airway closure. A total of 300 test runs on 70 individuals, including the individual in the above example, produced reproducible data.

Helium can also be used in combination with other gases, and the timing of introduction of the individual gases, as well as the mode of introduction, i.e., as individual boluses or mixtures, to the inspired air can be varied. This improved method can provide the means of differentiating between, and determining the extent of, different obstructive diseases of the small airways. According to this method, individual boluses of helium and another gas are inserted into the passageway leading to the lungs during inspiration between residual volume and 25 percent vital capacity after which during expiration the percentage of vital capacity is identified as residual volume is approached at which point the abrupt increases in the concentrations of the helium and the other gas occur. The difference between the points of abrupt increases in concentrations for the two gases are compared and related to standards previously obtained for the two gases.

What is claimed is:

1. A method of detecting impaired lung function comprising the steps of,
   a. a supplying directly, to a passageway leading to the lung at 0.25 percent VC during inhalation, a bolus of helium and thereafter
   b. measuring during expiration the helium concentration in the expirate to identify the point during expiration when an abrupt increase in the helium concentration occurs.

2. The method of claim 1 in which the bolus in the amount of about 1 cc is inserted at residual volume of the lung.

3. The method of claim 1 in which the point during expiration where an abrupt increase in the helium concentration occurs is detected and compared to statistically obtained information by computer to obtain evidence of the impaired lung function.

* * * * *